Sept. 8, 1936.  G. F. HOCHRIEM  2,053,433
WEIGHING AND TICKET PRINTING MACHINE
Filed Nov. 17, 1930   8 Sheets-Sheet 1

INVENTOR
GUSTAV F. HOCHRIEM
BY
Pennie, Davis, Marvin & Edmonds
HIS ATTORNEYS

Sept. 8, 1936.  G. F. HOCHRIEM  2,053,433
WEIGHING AND TICKET PRINTING MACHINE
Filed Nov. 17, 1930  8 Sheets-Sheet 3

INVENTOR
GUSTAV F. HOCHRIEM
BY
Pennie, Davis, Marvin and Edmunds
HIS ATTORNEYS Patented Sept. 8, 1936

2,053,433

UNITED STATES PATENT OFFICE 2,053,433

WEIGHING AND TICKET PRINTING MACHINE

Gustav F. Hochriem, Chicago, Ill., assignor to Camco Scale Corporation, New York, N. Y., a corporation of Delaware Application November 17, 1930, Serial No. 496,198

11 Claims. (Cl. 265—9)

This invention relates to weighing and ticket-printing machines and has for its object the provision of improvements in such machines. More particularly the invention is directed to improvements in weighing and ticket-printing machines of the kind which are controlled automatically by the insertion of a coin to print and eject a ticket showing the weight of the person standing upon the platform of the machine.

The invention relates especially to weighing and ticket-printing machines of the type illustrated and described in U. S. Patent No. 1,598,620, issued September 7, 1926 to Seth A. Rhodes and Gustav F. Hochriem, and in United States Patent 1,875,887, issued September 6, 1932 to the same inventors. Weighing and ticket-printing machines constructed as shown and described in this patent have been manufactured and used in considerable number and have been proven to be commercially operative and practicable. Nevertheless, the features of the present invention render such machines even more desirable.

The general operation of my improved machine is similar to that of the machine described in the earlier patent just mentioned, and is as follows:

The machine comprises a weighing mechanism, a ticket-printing mechanism, and a ticket-feeding mechanism. The cooperative relations of these mechanisms in the preferred form of the machine are as follows: The person desiring to be weighed steps upon the scale platform and a weight in the base of the machine is thereby elevated to store up energy for operating the printing mechanism, and is latched in elevated position. A printing wheel is also thereby rotated into position for the printing of the weight of the person on an appropriate ticket consisting of a small piece of cardboard. A quantity of these tickets is provided and the ticket-feeding mechanism feeds these tickets one by one from the top of a stack of tickets into printing position.

When the weighing mechanism has reached equilibrium (shown by an indicator at the top of the scale), a coin is dropped into the coin slot. The falling coin sets in action the coin-controlled elements, whereby the hammer of the printing mechanism strikes the superimposed ticket, inked ribbon, and printing wheel, and effects the desired printing action on the ticket. The printing hammer is instantly withdrawn from contact with the printed ticket, and the ticket-feeding mechanism operates to feed a new ticket to printing position, which forces the printed ticket out of printing position and causes it to fall into a receptacle from which it can be removed by the person weighed. The raising of the hammer and actuation of the ticket-feeding mechanism is accomplished by the energy which was stored up during the previous weighing operation. The person now steps off of the scale platform, the printing wheel returns to zero position, and the weight in the base descends and in so doing stores up energy for raising the printing hammer and actuating the ticket-feeding mechanism for the next weighing operation. The descent of the weight also returns the ticket-feeder to its original position, where it can remove another ticket from the top of the stack of tickets at the time of the next weighing operation.

One of the specific objects of the present invention is to provide a rearrangement of portions of the ticket-printing mechanism and the ticket-feeding and ejecting mechanism in such a way as to make the improved weighing and ticket-feeding machine more compact and lighter in weight than the machine of the prior patent mentioned and still retain ruggedness of construction, reliability of operation and length of life commensurate with those of the prior machine.

Another object of the invention is to provide a rearrangement of portions of the ticket-printing mechanism and the ticket-feeding and ejecting mechanism in such a way as to simplify these mechanisms in construction, operation and assembly thereby reducing the cost of manufacture of such machines without increasing the cost of maintaining the machines in operation.

It is an object of this invention also to provide an improved mechanism for maintaining the coin gate closed whenever all parts of the machine are not in proper position to deliver a printed ticket upon the insertion of a coin.

Another object of the invention is to provide a printing hammer release mechanism which is of light, simple construction but positive in operation.

The foregoing and other improved features of the machine of the invention will be best understood from the following description, taken in conjunction with the accompanying drawings, in which.

The machine comprises the usual base 20 and upright casing 21. The base 20 supports the scale platform 22 and the equalizing mechanism, and the casing 21 houses the weighing and ticket-printing mechanism. The casing 21 is provided with a hinged door 23 which is normally locked to prevent the mechanism from being tampered with and may be opened for the inspection or adjustment of the mechanism. In the top of this casing is the coin slot 24 and in the front the ticket receptacle 25, into which the printed ticket is ejected by the mechanism as will later be described, and from the upper part of which the ejected ticket may be removed by the patron of the machine. An indicator 26 is visible through a window in the top of the casing so that the person who steps upon the platform 22 to be weighed may see when the weighing mechanism has come to rest before placing the coin in slot 24. Casing 21 is also provided with a removable door or plate at the rear (not shown), by means of which certain parts of the mechanism may also be reached for inspection and adjustment.

The construction of the base mechanism is very similar to that of the prior patent mentioned above. Four legs 27 (see Figs. 2 to 5, inclusive) project from beneath the scale platform 22 and two of these rest upon an equalizing lever 28, and two upon a second equalizing lever 28a.

Each of the connections between the legs 27 and these equalizers consists of a saddle 29, which rests upon a knife edge 30 that projects from the side of one of the equalizers. Pins 31 projecting from opposite sides of saddle 29 are received in recesses in the bottoms of legs 27, so that the pressure of the knife edge is distributed evenly throughout the length of the saddle.

Figure 7:
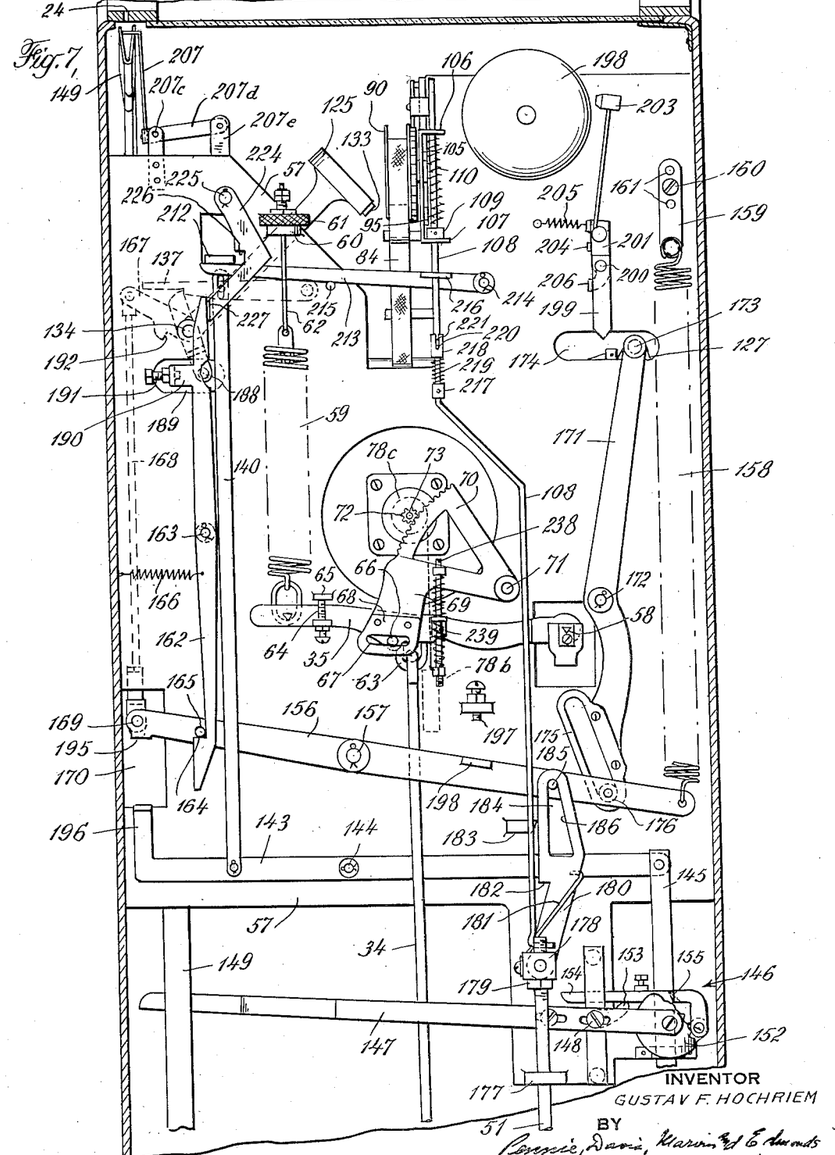
Fig. 7 is a view similar to Fig. 6 showing the various parts of the weighing and ticket-printing mechanism which are visible from the rear of the machine, when the casing is removed, as shown in section taken along line 7—7 of Fig. 8, the parts of the weighing and ticket-printing mechanism being shown in the position which they occupy before the person steps upon the scale platform to be weighed.

Equalizer lever 28 is supported at the front on a pair of knife edges 32 which rest in a pair of stirrups 33, and at its rear end by rod 34, which is pivoted thereto and attached at its upper end to a scale beam 35 (see Fig. 7). Equalizing lever 28a is supported by means of a pair of knife edges 36 which rest in a second set of stirrups 37, and is connected to equalizer 28 by means of knife edges 38 and 39 and the stirrup 40.

Stirrups 33 and 37, instead of being supported by the frame of the base, as they would be in an ordinary scale, are carried upon a pair of rods 41 and 42, which in turn are each mounted in a pair of bell crank levers 43 and 44 respectively. Hence, when a person steps upon platform 22, not only is rod 34 moved downward under the action of the equalizing levers 28 and 28a, but the whole equalizing lever system descends rotating the bell crank levers 43 and 44 about their respective pivots, which are shown at 45 and 46. The bell cranks 43 and 44 which are on the same side of the base are joined together by means of a link 47, so that they move in unison, causing the scale platform to be lowered bodily without tilting.

The angular movement of the bell crank levers 43 and 44, which occurs when a weight is placed upon platform 22, causes the raising of a weight 48 which is supported in the base 20 immediately below the casing 21 by means of a pair of arms 49, which are fixed in bosses 50 that project from the sides of bell crank levers 44. A rod 51 is pivoted at 52 to the weight 48, and hence is made to rise when the weight rises for the purpose of moving certain parts of the ticket-printing and delivering mechanism, as will be described.

The downward movement of the platform is arrested by means of a pair of stops 53, which are integral with the casing of the base and which are engaged by adjusting screws 54 in bell cranks 44.

Movement of the bell cranks in the opposite direction under the influence of weight 48 when the person steps off the platform, is limited by similar projections 55 which are indicated by adjusting screws 56, that are appropriately mounted in bell cranks 43.

It will be understood from the foregoing description of the base mechanism, that when a person steps upon the platform 22, the rod 51 is caused to move upwardly and the rod 34 downwardly under the influence of the weight thereby applied to the platform.

As in the construction of the prior patent mentioned above, the various parts of the weighing and ticket-printing mechanism are supported upon a plate 57 which is firmly attached to each side wall of casing 21, and is located between the front and rear faces of the casing, since this centrally located plate provides more satisfactory means of supporting the mechanism than providing independent supports for different parts of the mechanism.

The weighing mechanism (see Figs. 7 and 9) comprises the scale beam 35 which is supported at one end by knife bearings 58, which are carried in a bracket mounted on plate 57. At the other end the scale beam is secured to the lower end of a spring 59. The upper end of the spring is adjustably secured to a bracket 60 (also mounted on plate 57) by means of a knurled nut 61, which is threaded upon the upper end of a rod 62, which passes through bracket 60 and is attached to the spring. The rod 34 from the base mechanism is attached to the scale beam 35 by means of an eye 63.

These elements constitute a spring scale in which the movement of the beam 35 from its initial or zero position is proportional to the weight of the person standing on the scale platform. The initial or zero position of the beam 35 is determined by the engagement of an adjustable screw 64 (on the beam) with a stationary lock 65 (on plate 57).

The scale beam 35 carries a pin 66 registering with a slot 67 in a plate 68 secured to a bracket 69 of a sector-shaped gear member 70. The member 70 is pivotally mounted at 71 in a bracket secured to plate 57. Its gear teeth mesh with a pinion 72 secured to a shaft 73. The shaft 73 is horizontally mounted in adjustable ball bearings 74 carried by plate 75 and the rear member 76 of a bracket 77 (also secured to plate 57).

Figure 2:
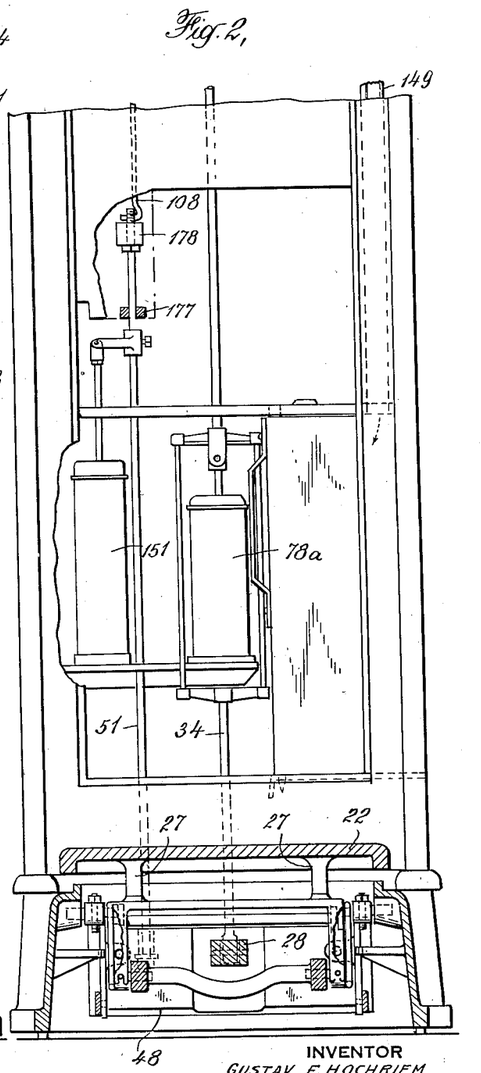
Fig. 2 is an enlarged front elevation of the lower part of the machine with the front door of the casing removed, and the base shown in section taken on line 2—2 of Fig. 3.
Figure 3:
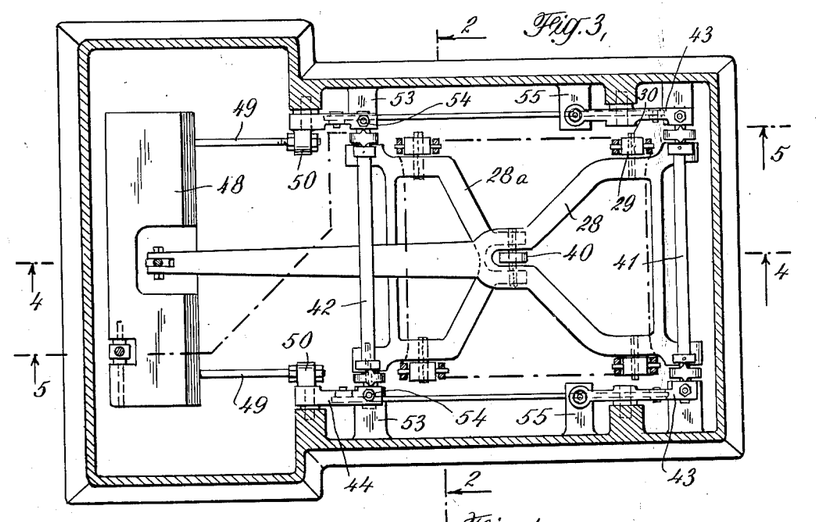
Figs. 3, 4 and 5 are views illustrative of the mechanism in the base of the machine, Fig. 3 being a horizontal section taken on line 3—3 of Fig. 4, Fig. 4 a vertical section taken on line 4—4 of Fig. 3, and Fig. 5 a vertical section taken on line 5—5 of Fig. 3.
Figure 4:
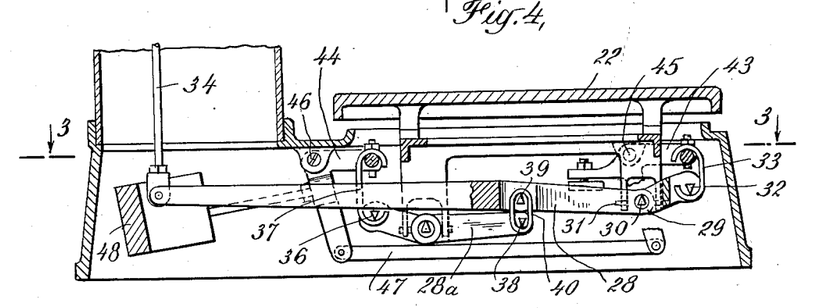
Figure 5:
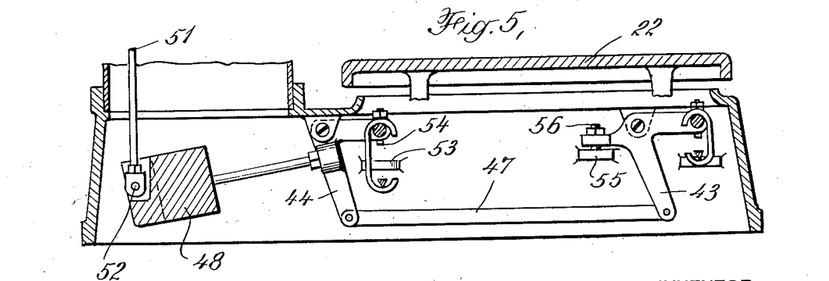

A printing wheel or disc 78 is secured to shaft 73 intermediate the ball bearings. The periphery of the wheel 78 is provided with raised figures indicating pounds, usually running from "20" to "300". When the person to be weighed steps on the scale platform, the printing wheel 78 is rotated (by the pinion 72, the sector-shaped gear member 70, slotted plate 68, and scale beam pin 66) until the figure on the periphery of the wheel corresponding to the weight of the person is uppermost and in proper printing position. In order to damp the oscillation of these parts and cause the printing wheel 78 to come quickly to rest, a dash pot 78a is mounted within the casing and its piston appropriately connected with rod 34 (Fig. 2).

It will be understood that as sector-shaped gear member 70 is mounted on a pivot which is displaced from the pivot of scale beam 35, a sliding action will take place between pin 66 and slot 67 so that the pin will engage different portions of the slot with varying weights upon the scale platform. This therefore constitutes a sealing mechanism by means of which inaccuracies in the various parts of the machine, and variations in the weighing spring 59 may be compensated for so as to cause the scale to weigh accurately. In order to take up the lost motion between the teeth of the pinion on shaft 73 and the teeth of gear member 70, and also to cause the upper surface of slot 67 always to rest upon the upper surface of pin 66, a small weight 78b is mounted upon a flexible thread which is wound upon a small pulley 78c on shaft 73.

Three small printing wheels 79, 80 and 81 are mounted on a shaft 82 in front of the printing wheel 78. The peripheries of these small wheels 79, 80 and 81 are provided with figures or legends for printing the month, day and year respectively. Shaft 82 is mounted between the rear member 76 and front member 83 of bracket 77. The uppermost peripheral surfaces of the four printing wheels 78, 79, 80 and 81 are in the same horizontal and vertical planes and directly beneath an inked ribbon 84. A member 85, which has a raised printing arrow in its upper surface, is adjustably mounted in the top of rear member 76 in the same horizontal and vertical planes as the four printing wheels.

Each of the dating wheels 79, 80 and 81 is provided with a ratchet and a cooperating spring actuating pawl (not shown) for holding the wheels in adjusted position. The month wheel is turned by means of a knurled disc 86, which is fixed to a sleeve surrounding shaft 82, to which the inner end of wheel 79 is also fixed. The day printing wheel 80 is turned by a knurled knob 87, which is fixed to the end of shaft 82, and wheel 80 is also fixed to this shaft. The year wheel 81 is mounted loosely on shaft 82, and is manually set or adjusted for the appropriate year. The names of the months are indicated on the outer surface of disc 86, and a disc 88 which is fixed to knob 87 carries the days of the month to facilitate the setting of these printing wheels.

The inked ribbon 84 is carried on a pair of ribbon spools 89 and 90 similar to the ordinary typewriter ribbon spools. It passes from one of these spools 89 over a guide 91 and beneath guides 92 and 93, and thence past guide 94 to spool 90. Guides 92 and 93 maintain the ribbon in taut horizontal position as it passes in close proximity to the uppermost peripheral surfaces of the four printing wheels 78, 79, 80 and 81 and the printing arrow 85.

The ribbon-feeding mechanism in general comprises a horizontal lever 95 pivoted at 96 to the frame of the machine, to which is pivoted at 97 a bar 98 which is adapted to slide vertically in guides 99 and 100. A pawl 101 is appropriately mounted on bar 98 to engage the ratchet wheels 102 and 103, which drive the ribbon spools 89 and 90 respectively. A reversing lever 104, which is engaged by the metal eyelet which is customarily provided near each end of typewriter ribbons, causes pawl 101 to be thrown into engagement with the teeth of the opposite ratchet wheel whenever the eyelet at either end of the ribbon engages the reversing lever 104. The details of this mechanism are described in the prior patent above mentioned.

The lever 95 which actuates the ribbon-feeding mechanism is oscillated vertically each time the rod 51 moves up and down (which, as will be seen hereafter, takes place once for each weighing and ticket-printing operation) by means of its connections with rod 51. These connections comprise a bar 105 pivoted to lever 95 and having apertured lateral projections 106 and 107 through which a rod 108 passes, this rod being suitably attached to the upper end of rod 51 so as to cause it to move vertically with rod 51. A collar 109 fixed upon rod 108 engages lower projection 107 each time rod 108 descends, and causes lever 95 to be pulled down, thus effecting the advancement of ribbon 84. When rod 108 moves upwardly, a spiral spring 110 which surrounds rod 108 above collar 109 engages the upper projection 106 and provides a resilient means for returning lever 95 to its uppermost position and at the same time allowing the travel of rod 108 to be greater than that of bar 105, without danger of damaging the ribbon-feeding mechanism.

Figure 6:
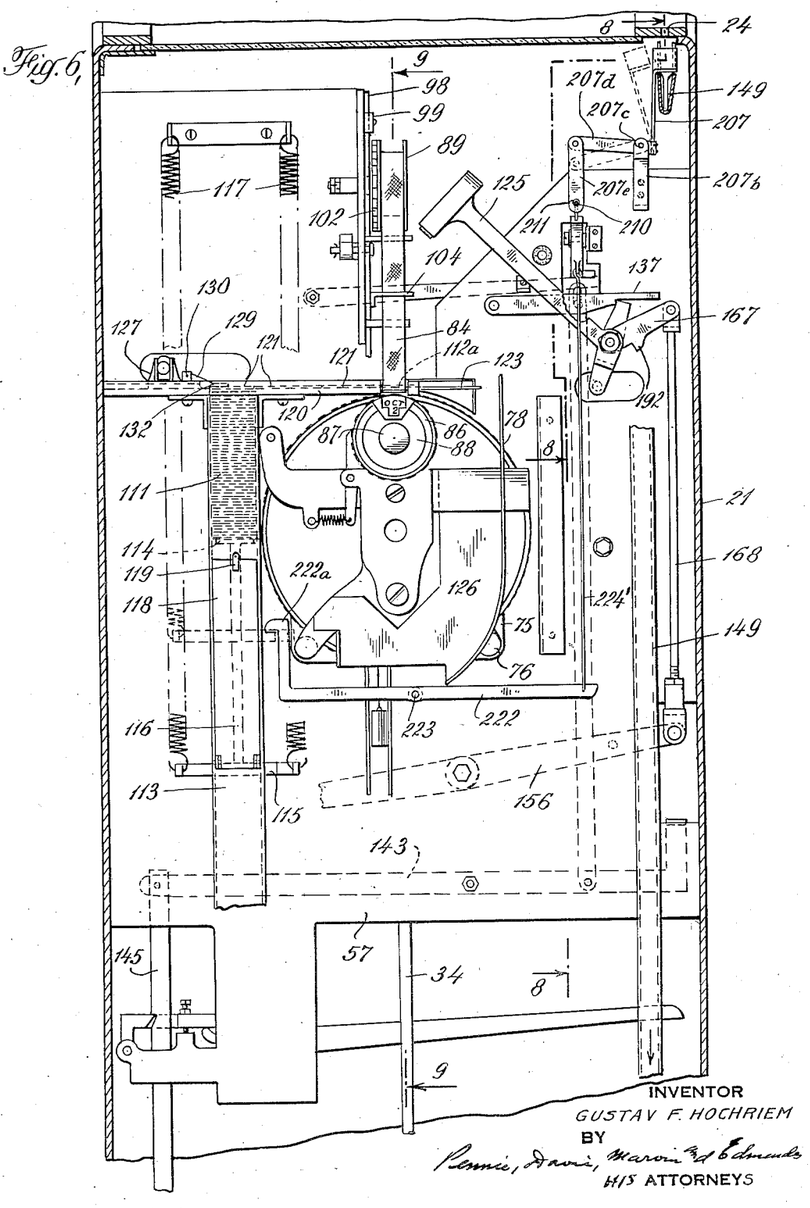
Fig. 6 is an enlarged front elevation of the upper part of the machine with the casing shown in section taken on line 6—6 of Fig. 8 to expose to view the various parts of the weighing and ticket-printing mechanism which are visible from the front of the machine.
Figure 9:
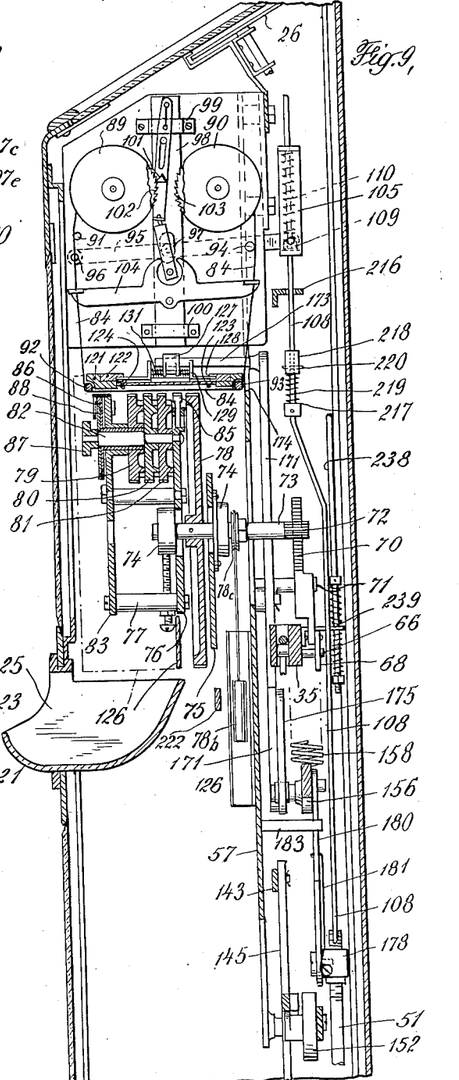
Fig. 9 is also a vertical endwise section taken on line 9—9 of Fig. 6 looking in the direction of the arrows, showing details of the weighing and ticket printing mechanism, and also showing in side elevation the ribbon feed mechanism.

The ticket magazine and ticket feeder are illustrated in Figs. 6 and 9. A stack of cardboard tickets 111 is carried in a magazine which comprises a pair of vertical guides 113. These guides are of such shape as to maintain the tickets accurately in vertical alignment and still permit the tickets to slide upwardly with as little friction as possible.

The tickets are urged upwardly by a follower 114 which presses against the lowermost ticket and which is connected with a cross-bar 115 by a post 116. A pair of long, closely-wound spiral springs 117 are connected with cross-bar 115 at their lower ends and to the top of the casing 21 at their upper ends. The tickets are inserted into the magazine through a door 118 which is hinged to the outermost vertical guide 113 so as to swing outwardly, a button 119 being provided to hold the door in closed position. In introducing tickets, the follower 114 and any tickets which may remain in the machine are lowered to a point below the bottom of door 118, and the new tickets are inserted above them.

Inasmuch as the tickets have to be fed to the uppermost peripheral surfaces of the four printing wheels 78, 79, 80 and 81 in order to reach printing position, and inasmuch as the weight printing wheel 78 is necessarily of relatively large diameter, the ticket guides 113 are located at one side of the center of the machine, and the tickets are fed one by one from the top of the stack of tickets 111 along a pair of horizontal guide-ways 120, which convey the tickets from the top of the stack 111 to printing position.

One of these guide-ways is provided for each end of the ticket, and each guide-way comprises a pair of metal bars 121 and 122 (Fig. 9) with a slot between them which is just a little wider than the thickness of the cardboard tickets, so that the tickets will slide freely therein. These slots are not seen in Fig. 9, since this section is taken through the center of the printing position, as may be seen from Fig. 6. At the printing position (indicated by ticket 112a), the lower parts of bars 121 are cut away and ticket 112a is supported on a pair of small, straight wire springs 123 and 124. The printing hammer is indicated at 125, and the resilient support of the ticket 112a on the resilient wires 123 and 124 permits the printing hammer in its descent to force the superimposed ticket and inked ribbon downward into contact with the surfaces of the four printing wheels, and as soon as the pressure of the printing hammer is released, the springs 123 and 124 immediately lift the ticket and ribbon out of contact with each other and with the printing wheels, so that a clear impression is registered. A smudgy impression is also avoided through the separation of the ticket and ribbon by means of the springs 123 and 124.

The front spring 124 terminates at the right hand edge of ticket 112a (Fig. 6), while the rear spring 123 extends a substantial distance beyond this point so as to support the rear end of ticket 112a for an instant after ticket 112a is ejected from printing position by the advancement of ticket 112 immediately behind it. As ticket 112a leaves printing position and its forward end moves away from the support afforded by spring 124, the ticket pitches downwardly into a ticket chute 126 (Fig. 6), by which it is conveyed into the ticket receptacle 25, where it is within the reach of the person being weighed.

The tickets are fed one at a time along the guide-ways 120 by means of a ticket feeder 127 which slides in narrow slots 128 cut along the inner surfaces of the upper bars 122. The ticket feeder is provided with a pair of dogs 129 pivotally mounted on the feeder at 130 and resiliently held against the upper surface of the uppermost ticket in the stack of tickets 111 by means of small springs 131, which may be seen in Fig. 9. Dogs 129 are provided with shallow notches 132 deep enough to positively engage the uppermost ticket of the stack without interfering with the next ticket below.

Further details of the ticket magazine and ticket feeder mechanisms are described in the prior patent above mentioned.

The remainder of the description will be directed chiefly to the portions of the machine mechanism with which the present invention is more especially concerned. In their order of operation, various parts of this mechanism latch the printing hammer in its upward position; effect the tripping of this latch so as to allow the printing hammer to fall and cause the printing of a ticket; withdraw the printing hammer from contact with the printed ticket and reset it, that is, restore it to its original upward position; actuate the ticket-feeding mechanism to feed a new ticket to printing position and eject the printed ticket; store up energy for resetting the printing hammer and actuating the ticket-feed mechanism during the next following weighing operation; and return the ticket feeder to its original position where it can slide another ticket from the top of the stack at the time of the next weighing operation. The improved portions of the machine mechanism also include an interlocking device whereby the opening of the coin gate is prevented whenever the parts of the machine are not in proper condition to effect the printing of a ticket upon the insertion of a coin.

The printing hammer 125 consists of a head in the working face of which there is inserted a cushion 133 of rubber or other suitable resilient material, which will effect a uniform impression. The arm of the printing hammer is pivoted on a stud 134, which projects forwardly from the plate 57. Fixed to the base of the hammer arm is an upwardly projecting finger 135 curved at the top and provided with a sharp corner adapted to be engaged by a notch 136 in a latch 137, which is pivoted to plate 57 at 138, and serves to retain the hammer in its upward position.

Figures 11, 12, 13, 14:
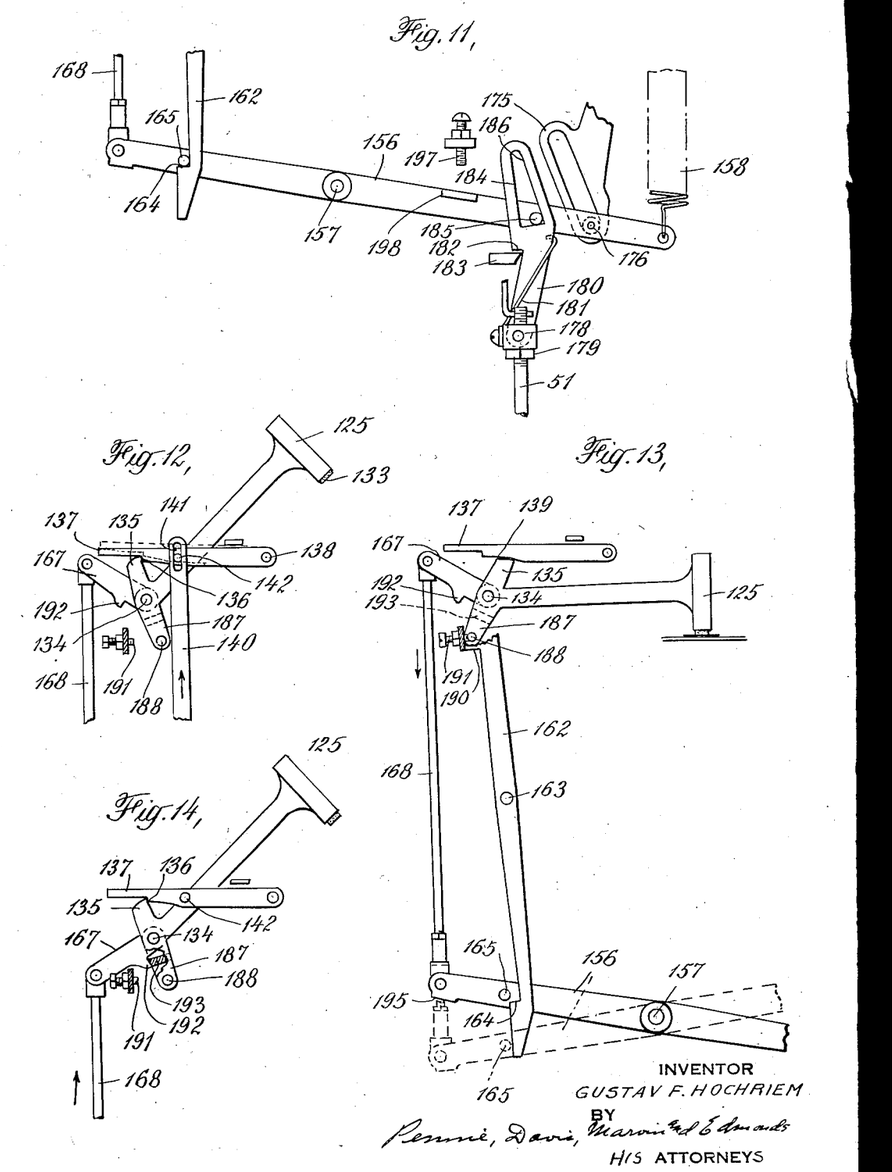
Fig. 11 shows the position of the main actuating lever and its associated parts after the person steps upon the platform but before the coin is inserted.
Fig. 12 is a rear elevation of the printing hammer together with its latch and resetting lever.
Fig. 13 is a rear elevation of the printing hammer and a portion of the main actuating lever, showing the position of the hammer at the instant of printing the ticket and tripping the main actuating lever.
Fig. 14 is a rear elevation of the printing hammer after being reset by the resetting lever, and before the resetting lever has been raised by the movement of the main actuating lever which takes place when the person steps off the scale platform.

Latch 137 is tripped when a coin is inserted in the machine, and allows the hammer to fall to the position shown in Fig. 13 and effect a printing action on the ticket. During the falling of the hammer, the curved surface 139 of latch 137 rides over the curved surface of finger 135, without further raising the latch so that the latch offers no resistance to the falling hammer.

The pressure of finger 135 against notch 136 when the hammer is in its upper position is sufficient to cause considerable friction between these surfaces, so that some little pressure is required to disengage latch 137 from the finger and raise it to the dotted position shown in Fig. 12, where the hammer is released. This pressure for lifting the latch is provided by means of an inertia release mechanism, which comprises a vertical bar 140 having a slot 141 at its upper end, which coacts with a pin 142 on the side of latch 137.

Bar 140 is pivotally attached at its lower end to a light horizontal lever 143 which is pivoted to plate 57 at 144. To the opposite end of lever 143 there is pivotally attached a vertical bar 145 which, although not heavy, is of sufficient weight so that when it is released by the coin release mechanism indicated generally at 146, the fall of bar 145 causes lever 143 to be tilted about its pivot, and bar 140 to be raised with a sufficient force so that when the bottom of slot 141 strikes pin 142, latch 137 will be knocked upwardly and release the printing hammer. The space between the bottom of slot 141 and pin 142 prior to the tripping of the coin release mechanism 146 is sufficient so that a hammer-blow action of considerable magnitude will be exerted upon pin 142.

The coin release mechanism 146 is described in detail in the prior patent above referred to. In general it consists of a substantially balanced coin lever 147 which is pivoted at 148, and whose front end extends through a slot in the coin chute 149. When a coin 150 is inserted in the coin slot 24, it falls by gravity down the coin chute and strikes the lever 147 with force enough to rotate the lever about its pivot 148, raising balance weight 152 on the tail of the lever. The finger 153, also attached to the tail of the lever, raises a secondary lever 154 provided with a latching edge 155, and disengages this latching edge from a coacting notch in vertical bar 145, releasing the bar.

In the improved mechanism, the resetting of printing hammer 125, the resetting of lever 143, and its connected parts, and the actuation of the ticket feeder 127 is accomplished by means of a main actuating lever 156. This lever is of relatively heavy construction, is pivoted to plate 57 on a stud 157, and extends cross-wise of the machine substantially horizontally and parallel with lever 143. Power for operating main actuating lever 156 is supplied by means of a relatively strong, spiral spring 158, the lower end of which is attached to the lever, and the upper end of which is fixed by means of a suitable hook 159 to plate 57. This hook is attached to the plate by means of a screw 160, passing through one of a plurality of holes 161. The tension of spring 158 may be adjusted by shifting screw 160 to one or another of these holes.

When the main actuating lever is in its original or normal position as shown in Fig. 7, spring 158 is stretched and power for operating the lever is thus stored in the spring. The main actuating lever is held in this position by means of a latch lever 162. This lever is of light construction, preferably being stamped from heavy gauge sheet metal. It is pivoted to the plate 57 at 163 approximately midway between its ends, and extends vertically from a point near the left hand end of the main actuating lever 156 to a point adjacent the stud 134, upon which the printing hammer is pivoted. Latch lever 162 has a notch at its lower end for engaging a pin 165 on main actuating lever 156, and holding the lever in its normal position against the tension of spring 158. For this purpose latch lever 162 is biased by means of a light spiral spring 166.

The main actuating lever 156 is connected with printing hammer resetting lever 167 also mounted on stud 134 by means of a link 168 pivotally attached to the outer end of resetting lever 167 and also to the left hand end of lever 156 as viewed in Fig. 7. As the resetting lever 157 is on the front of plate 57 and main actuating lever 156 is mounted on the rear of this plate, the connection between the lower end of link 168 and the end of main actuating lever 156 is made to the front end of a stud 169, which is fixed to main actuating lever 156, and which projects through a rectangular opening 170 in plate 57.

Main actuating lever 156 is connected to the ticket feeder 127 by means of a vertical lever 171 which is pivoted on a stud 172 mounted on the rear of plate 57, and which has a short horizontal rod 173 fixed at its upper end. This rod passes through an elongated opening 174 in plate 57, and is received loosely in a vertical slot in the ticket feeder 127, to thereby move the same back and forth horizontally. The lower end of lever 171 has a slotted plate 175 affixed thereto. A roller 176 suitably mounted on the side of main actuating lever 156 cooperates with the slot in this slotted plate, and causes the upper end of lever 171 (and hence the ticket feeder) to be moved horizontally to the left as viewed in Fig. 7 when the right hand end of main actuating lever 156 moves upwardly under the action of spring 158. An opposite movement of the ticket feeder occurs when main actuating lever 156 is moved in the reverse direction.

After a weighing operation during which main actuating lever 156 has been rotated about its pivot by spring 158, it is returned to its original position (shown in Fig. 7) by the descent of weight 48 in the base of the scale, which takes place when the person steps off of the scale platform. It will be remembered that rod 51 is connected at its lower end to this weight and hence is raised when a person steps on the platform, and lowered when the person steps off of the platform. Rod 151 slides through a guide 177, which projects rearwardly from the plate 57 at its lowermost point.

A metal block 178 is threaded upon the upper end of rod 51 and secured in position with its flat faces parallel with the plate 57 by means of a lock nut 179. On the inner face of block 178 there is pivoted a slotted latch 180 which is biased toward the left as viewed in Fig. 7, by means of a spring 181.

This latch performs two functions. The first is to latch rod 51 and weight 48 in their uppermost position so as to prevent wear of the machine by repeated movement of the platform unaccompanied by the insertion of a coin. This is accomplished by means of a latching notch 182, which catches upon the upper surface of a boss 183 which projects rearwardly from plate 57. The other function of slotted latch 180 is that of connecting main actuating lever 156 with rod 51 so as to return the main actuating lever to its original position and thus store up power in spring 158. This is accomplished by means of a slot 184 in which is a pin 185 that projects from the side of main actuating lever 156. The right-hand edge of this slot is made sloping to provide a cam surface 186, the function of which will be made clear later.

In Fig. 7 the parts are in the position which they occupy after the termination of the preceding weighing operation and before a person steps upon the platform for another weighing operation. The main actuating lever has been pulled down by rod 51 and slotted latch 180 and the upper end of slot 184 is still in contact with pin 185. In Fig. 11, however, the relative positions of the rod 51, slotted latch 180, and main actuating lever 156 are shown in the position which they assume after a person steps upon the scale platform and before a coin is dropped in the coin slot. Hence if a coin were inserted in the coin slot, although the printing hammer would be released and the ticket printed, nevertheless the printed ticket would not be ejected because main actuating lever 156 is held against movement.

It will be remembered that the application of the person's weight to the platform causes rod 51 to rise. This causes notch 182 to catch upon boss 183 so that if the person stepped off the platform the weight 48 would pull down the notch 182 against the top of boss 183 and be supported thereby in its upward position. The upward movement of slotted latch 180 also carries the bottom of slot 184 upward to a point adjacent pin 185 so that main actuating lever 156 can be rocked about its pivot by spring 158 without being restrained by slotted latch 180.

Figure 8:
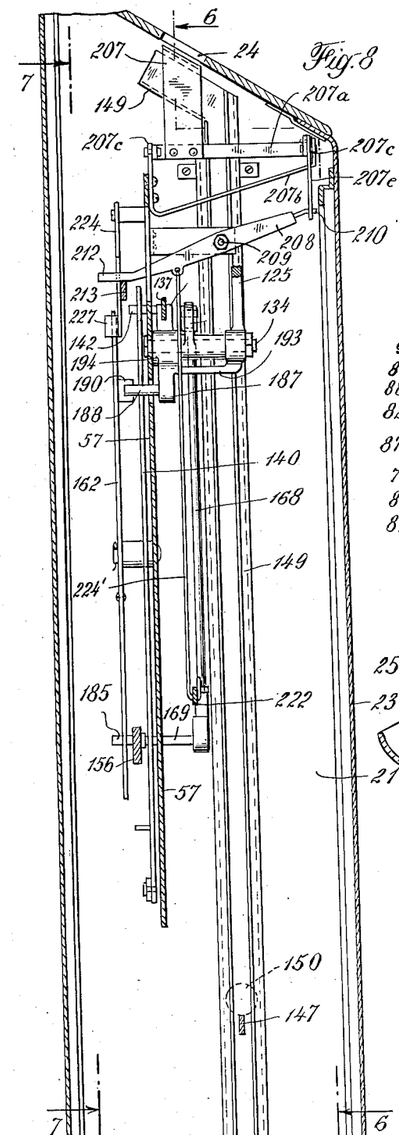
Fig. 8 is a vertical endwise section taken on line 8—8 of Fig. 6, looking in the direction of the arrows and showing a portion of the printing hammer mechanism and the coin gate mechanism.
Figure 10:
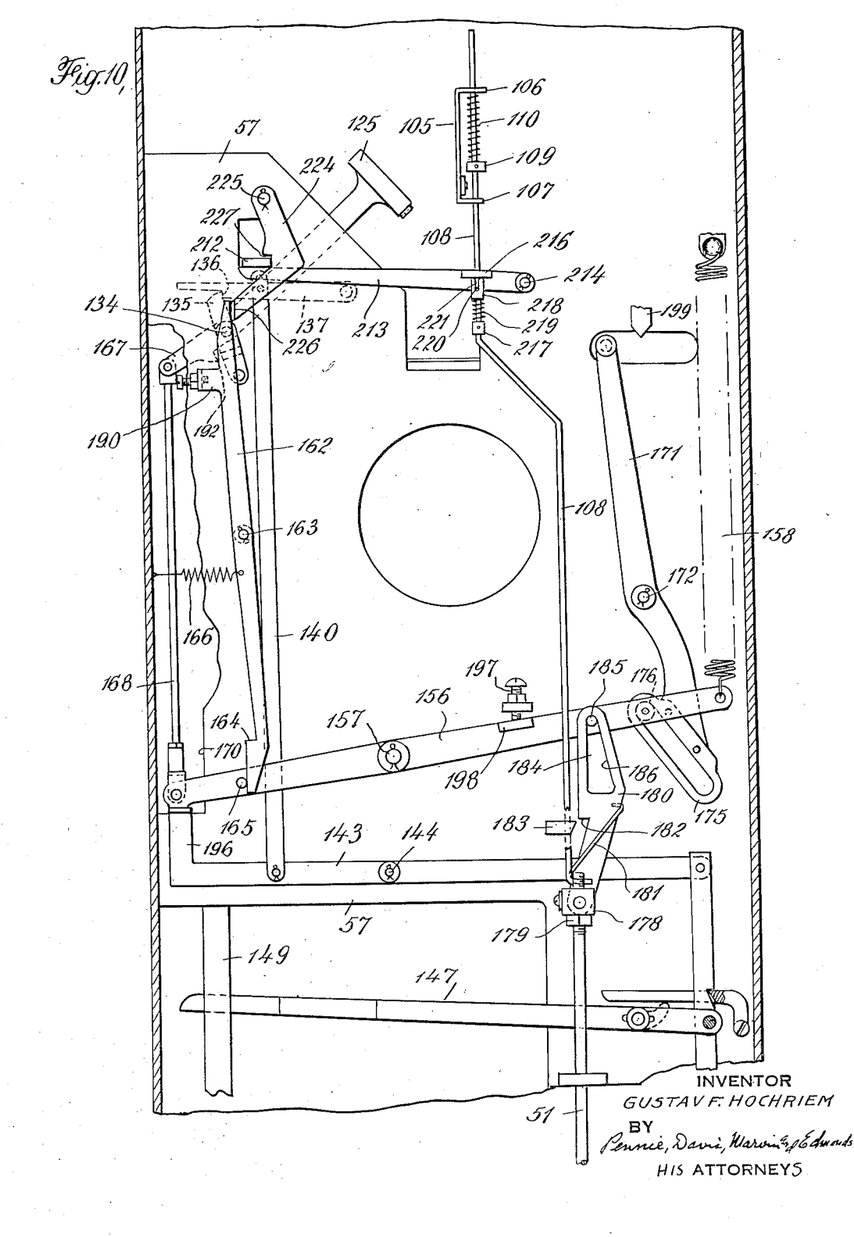
Fig. 10 is a view similar to Fig. 7 but with the weighing mechanism and the ribbon feeding mechanism omitted for the sake of clearness, showing the ticket printing mechanism and coin gate control mechanism. The position of the parts shown in this view is that which occurs after the insertion of a coin, and the printing and ejection of a ticket, the person still remaining on the scale platform.

When a coin is inserted in the coin slot causing the printing hammer 125 to fall and strike the ticket (Fig. 13), an arm 187 which is fixed to the hammer arm (Fig. 8) and projects downwardly in the opposite direction from finger 135, moves to the left. A stud 188 which is fixed to arm 187 and extends through an opening 189 in plate 57 strikes an L-shaped projection 190 which extends rearwardly from the upper portion of latch lever 162. This contact is actually made with the inner end of an adjusting screw 191, threaded through L-shaped projection 190, and which permits the adjustment of the timing of this tripping action. It will be understood that the movement of latch lever 162 which thus takes place instantly causes the release of notch 164 from pin 165 on the main actuating lever 156, and the main actuating lever is hence rocked about its pivot 157 by the pull of spring 158. This release of the actuating lever is adjusted to take place substantially simultaneously with the contact of the printing hammer with the surface of the ticket. The position of the various parts immediately after the release of the main actuating lever 156 is shown in Fig. 10.

The following actions take place during the operation of the main actuating lever by the pull of spring 158: The printing hammer 125 is instantly withdrawn from contact with the printed ticket and elevated to its original position. Lever 143 and its connected parts are reset. Ticket feeder 127 is moved to the left as viewed in Fig. 7 causing the ejection of the printed ticket and the advancement of an unprinted ticket to the printing position and the sounding of a signal or gong. Slotted latch 180 is moved to the right as viewed in Fig. 11 to release notch 182 from boss 183 so as to permit the main actuating lever 156 to be reset by weight 48 as will appear later. This movement is effected by the coaction of pin 185 with cam surface 186.

The resetting of the printing hammer is accomplished by the downward movement of rod 168 and resetting lever 167 which causes a lug 192 on this lever to engage a horizontal bar 193 (Figs. 8 and 14) which joins the lower end of the arm of the printing hammer 125 with the hub which supports arm 187 and finger 135. When main actuating lever 156 reaches the end of its movement under the action of spring 158, as shown in Fig. 10, printing hammer 125 has been elevated to its uppermost position and finger 135 has been latched behind notch 136 of latch 137 (Fig. 14), and the printing hammer is thus held in its original position ready for a subsequent printing operation. The length of slot 141 in vertical bar 148 is sufficient to permit latch 137 to rise sufficiently for the latching action of finger 135 and notch 136 to take place.

To reset lever 143, a boss 195 on the lower side of the left hand end of the main actuating lever (as viewed in Fig. 7) engages a projection 196 which extends upwardly from the left hand end of lever 143 and moves this end of lever 143 downwardly. An instant after latch 137 drops behind finger 135, the latching edge 155 of the secondary lever 154 of the coin release mechanism 146 drops into its coacting notch in vertical bar 145 and supports this bar and lever 143 and bar 140 in their original positions in which they are ready to be tripped by the insertion of another coin.

The upward movement of roller 176 on the right hand end of main actuating lever 156 in the slotted plate 175 causes vertical lever 171 to be rocked in the counterclockwise direction thereby moving ticket feeder 127 to the left (Fig. 7) and causing the feeding of the ticket above referred to.

The rocking of the main actuating lever 156 under the action of spring 158 is limited by means of an adjustable stop 197 which engages a lug 198 on the main actuating lever.

Simultaneously with the ejection of the printed ticket, the signal or gong 198 is sounded. This is accomplished by the movement of the upper end of vertical lever 171 to the left as viewed in Fig. 7. During this movement the upper end of this lever engages a pointed lever 199 which is loosely pivoted at 200 to a striker supporting member 201 also pivoted at 200. A striker 203 is resiliently attached to the supporting member 201 in position to contact with the gong 198. Striker supporting member 201 is biased against a stop 204 by means of a small spiral spring 205.

The pressure of the upper end of lever 171 against the pointed lever 199 moves this lever against an abutment 206 on the lower end of striker supporting member 201 and causes the simultaneous rotation of lever 199 and the striker supporting member 201 about pivot 200. Before the lever 171 reaches the end of its stroke, the lower end of pointed lever 199 slips past the upper end of lever 171 and the striker supporting member 201 flies to the left (under the tension of spring 205) against stop 204 causing striker 203 to strike the gong 198. During the return movement of lever 171 toward the right which will be described presently, pointed lever 199 swings idly about its pivot 200 away from abutment 206 without interfering with the movement of lever 171.

The weight of the person standing upon the platform has now been printed upon the ticket and the ticket discharged into receptacle 25. The person removes the ticket from this receptacle and steps off of the scale platform 22. The removal of his weight from the scale platform permits weight 48 and rod 51 (which is connected thereto) to descend, slotted latch 180 having been moved to the right to the position shown in Fig. 10, by the movement of the main actuating lever thereby moving notch 182 away from boss 183 and serving to connect rod 51 to main actuating lever 156 at the upper end of slot 184. The descent of weight 48 and rod 51 is retarded by means of a dash pot 151 as shown in Fig. 2, appropriately supported above the casing of the machine and having its piston connected to an arm attached to rod 51.

The descent of rod 51 carries the right hand end of main actuating lever 156 downward returning the main actuating lever to its original position. This movement stretches spring 158 and stores energy therein for the next weighing operation. It also causes lever 171 to carry the ticket feeder 127 back to its original position at the right as shown in Fig. 7, where it is ready during the next weighing operation to remove another ticket from the top of the stack of tickets 111 and advance it along the guideways 120. In addition the resetting of main actuating lever causes link 168 and printing hammer resetting lever 167 to be raised, thus backing away lug 192 from bar 193 and leaving printing hammer 125 held in raised position by latch 137. The backing away of lug 192 leaves the printing hammer in condition to fall freely when released by latch 137 upon the insertion of another coin in the coin slot.

The resetting of main actuating lever 156 also, as above referred to, causes its left hand end to be raised free from projection 196 of lever 143 leaving this lever and its connected parts comprising the inertia trip mechanism ready for actuation.

The downward movement of the right hand end of main actuating lever 156 under the pull of rod 51 is limited by the stop comprising projection 55 in the base of the machine previously described.

Before describing the improved coin slot gate control mechanism which forms a part of the present invention, various parts of the mechanism of the improved machine above described will be contrasted with the corresponding mechanism of the machine of the prior patent above mentioned.

In the machine of the prior patent there were a multiplicity of interdependent levers, one releasing another in sequence to cause them to perform their respective operations to actuate the ticket printing and feeding mechanism. In the improved machine the main actuating lever 156 is made the main element of the mechanism for actuating the ticket printing and feeding mechanisms. Thus both the ticket feeding mechanism and the printing hammer resetting mechanism are connected directly and positively to the main actuating lever 156. The mere release of the latch lever 162 for the main actuating lever causes this lever to be actuated by its spring 158 and this causes the desired resetting actions to take place together with the feeding of the ticket and the movement of the slotted latch 180 so as to permit the main actuating lever itself to be reset by weight 48 when the person steps off the scale platform.

In the machine of the prior patent, an auxiliary weight was employed in the upper part of the casing for supplying the energy for resetting the printing hammer and effecting the feed of the ticket. In the improved machine the main actuating lever is actuated by a spiral spring. The spring occupies far less space in the casing than a weight, since a weight of considerable size is necessary to provide the energy required. The use of the spring instead of a weight therefor enables the casing to be made smaller. Moreover the spring is very much lighter in weight and makes the scale easier to move about. The substitution of a spring in place of a weight reduces the amount of friction of the various wearing surfaces and hence permits the mechanism to operate more smoothly and quietly and without as much proportionate wear and tear. In short this substitution simplifies the construction of the machine, makes it more compact, lighter in weight and more serviceable.

Another feature of the improved machine which is not found in the machine of the prior patent is the arrangement of the latch lever for the main actuating lever in such a position that one end of the latch lever is adjacent to the printing hammer. By means of this arrangement and by providing a printing hammer so arranged that the parts moving therewith as the hammer falls to printing position possess small inertia, the hammer is made to fall instantly upon its release, and the tripping of the main actuating lever is easily timed in relation to the contact of the hammer with the ticket being printed. Moreover, this arrangement provides for a direct application of the motion of the falling printing hammer to the latch lever which eliminates additional linkages and pivots and simplifies the construction of the ticket printing and feeding mechanism.

Another improvement in the present machine is to be found in the general arrangement of the levers which actuate the ticket printing and feeding mechanism. Thus the main actuating lever 156 is parallel to and below the guideways 120 which carry the tickets to printing position and therefore parallel to the path of the ticket feeder 127, and the lever 171 for actuating the ticket feeder is at right angles to the main actuating lever and actuated thereby through the instrumentality of a cam slot and pin. This arrangement is extremely convenient for mounting upon the central supporting plate 57 and facilitates the location of these levers in the rear of plate 57 thus leaving the front of the plate comparatively free from mechanism. It is desirable to arrange as much of the mechanism as possible on one side of plate 57 since this makes it more convenient to lubricate, adjust or repair. With this general arrangement of the mechanism, also, the scale beam itself can be readily mounted upon the rear of plate 57, and the sealing mechanism and operative connections with the printing disc 78 can be readily mounted in proximity to the shaft of disc 78 while the main actuating lever, the latch lever for the main actuating lever, the ticket feeder guides, and the ticket feeder actuating lever arrange themselves substantially in the form of a square surrounding this mechanism.

Another feature of improvement possessed by the new machine over the machine disclosed in the prior patent is to be found in the manner in which the rod connecting the base mechanism with the ticket printing and feeding mechanism is made operative to perform the functions desired. In the machine of the prior patent the upper end of this rod is positively connected by means of a link to one of the multiplicity of interdependent levers so that the lever is compelled to move up and down according to the movement of the rod. This necessitates the employment of a second lever of equally heavy construction and pivoted coaxially with the first by which the motion of the first lever may be transmitted during the downward movement of the weight in order to store up energy for the operation of the machine.

In the machine of the present invention only one lever is necessary, namely the main actuating lever 156 since provision is made for latching the weight 48 and rod 51 in their uppermost position and then at the proper time transferring the downward force exerted by the rod and weight from the latch to the main actuating lever causing the right hand end of this lever to be drawn down and spring 158 to be stretched. In the mechanism illustrated this is accomplished by means of the slotted latch 180, this latch being held in its uppermost position either by the weight of the person upon the platform or by the engagement with boss 183, and having the notch 182 thereon drawn out of engagement with the boss by the movement of the main actuating lever when pin 185 engages cam surface 186, this action bringing the upper end of slot 184 into contact with the pin 185 so that when the person steps off of the scale platform the pin and the right hand end of the main actuating lever will be drawn down by the descent of weight 48.

In the mechanism of the prior machine above mentioned, on account of the fact that the same system of levers and links was used both for tripping and resetting the printing hammer, it was necessary to make all of these parts of relatively heavy construction, and to provide a spring to supplement gravitational force in causing the printing hammer to effect the printing operation. In the improved mechanism of the present invention, however, wherein the resetting lever 167 is actuated by the main actuating lever 156, provision is made for permitting the printing hammer 125 to fall freely, and the inertia trip mechanism above described comprising bar 145, lever 143, vertical bar 140 and slot and pin connection with latch 137 provides for a quick trip or release of the printing hammer so that it falls suddenly and effectively without the use of a supplementary spring.

Returning now to the description of the machine mechanism, the coin slot 24 is shown in Figs. 1, 6, 7, 8 and 16. Coin chute 149 (Figs. 8 and 6) extends vertical to the sloping top of casing 21 and then bends parallel to the sloping top so as to receive coins inserted through the coin slot 24. The gate 207 for the coin slot consists of a piece of sheet metal approximately as wide as the slot is long having its upper edge bent over parallel with the inside surface of the sloping top of the casing and serving when in the full line position of Fig. 6 to prevent a coin from being received in coin slot 24. The coin gate 207 is secured to a horizontal mounting 207a which is pivoted at its opposite ends to a bracket 207b which is fixed to plate 57. These pivots are indicated at 207c.

The coin gate mounting 207a has a lever 207d which extends horizontally as shown in Fig. 6 and from the end of which a link 207e depends. A gate actuating lever 208 is pivoted at 209 substantially midway between its ends upon a small bracket which extends forward from plate 57. The front end of lever 208 terminates in a small circular portion 210 which extends loosely through an aperture 211 in link 207e. Upward motion of the rear end of lever 208 will cause movement of coin gate 207 to the dotted or open position shown in Fig. 6. The gate is normally held in closed position by means of a small weight 212 upon the rear end of lever 208.

The coin gate is normally closed in order to prevent the insertion of a coin in the coin slot when there is no weight upon the scale platform, and the various parts of the machine mechanism are not in proper position to deliver a printed weight ticket. In order to cause the opening of the gate when a person steps upon the scale platform, a horizontal lever 213 (Figs. 7 and 10) is pivoted to plate 57 at 214 and extends to the left with its extreme left hand end beneath the small weight 212 on the lower end of gate actuating lever 208. A stop 215 (Fig. 7) supports lever 213 when there is no weight upon the scale platform.

There is a lug 216 on lever 213 near the pivot 214. This lug is provided with an aperture through which rod 108 passes, rod 108 being secured to the upper end of rod 51 which is the rod that is raised by weight 48 when a person steps upon the scale platform and lowered when his weight is removed from the platform.

On rod 108 below lug 216 there is a small collar 217 which is fixed to the rod and above this fixed collar is a collar 218 which is slidable upon the rod. Between these two collars there is a small spiral spring 219 which urges slidable collar 218 upward against a small pin 220 which passes through rod 108 and through a slot 221 in slidable collar 218.

The position of the parts before a person steps upon the scale platform is shown in Fig. 7, whereas the position of the parts after a weight is placed upon the scale platform is shown in Fig. 10, wherein it will be seen that slidable collar 218 has moved upwardly and lifted lug 216 on lever 213 thereby causing the opening of the coin gate 207. Contact between the upper edge of collar 218 and lug 216 is not made until after notch 182 has passed above boss 183. Hence the coin slot does not open until weight 48 has been raised sufficiently to reset the main actuating lever 156 after a previous weighing operation. Moreover the recession of notch 182 through the minute distance indicated in Fig. 11 until it contacts with boss 183, is sufficient to cause the lowering of lever 213 to close the coin slot. A very slight pressure upon the scale platform consequently opens the coin gate.

The mechanism for preventing the opening of the coin gate when the supply of tickets in the stack 111 is exhausted is similar to the mechanism in the machine of the prior patent. This comprises a lever 222 pivoted at 223 (also on plate 57), the left hand end of which as viewed in Fig. 6 has a finger 222a in the path of cross-bar 115 upon which ticket follower 114 is supported, and the right hand end of which is connected to the rear portion of the gate actuating lever 208 by means of a link 224'. Cross-bar 115 comes into contact with finger 222a when the last ticket is removed from follower 114 and prevents the depression of the left hand end of lever 222 which normally occurs when the coin slot is opened by the mechanism previously described. This holds the coin gate closed. When a person steps upon the platform under these circumstances, sliding collar 218 engages lug 216 on lever 213 and slides downwardly on rod 108 compressing spiral spring 219 and without raising lever 213.

It sometimes occurs that for one reason or another the tickets become jammed in the guideways 129. In this case if the coin slot were open and a coin were inserted, the printing hammer would descend, but the ticket feeder 127 would not be moved to the left, as viewed in Fig. 7, to cause the feeding of a ticket. The coin slot should therefore be kept closed when this happens. Furthermore it may sometimes occur that the printing hammer will not be properly reset. In order to maintain the coin slot closed under either of these conditions, the interlock lever 224 is provided. This lever is pivoted at 225 (also on plate 57), at a point somewhat above the printing hammer 125. It has a locking edge 226 which is arranged to engage the upper surface of the small weight 212 on gate actuating lever 208, and it also has a depending extension 227 which is adapted to be engaged by the upper end of latch lever 162 of the main actuating lever 156. Interlock lever 224 is so balanced that under its own weight it tends to move to the left as shown in Fig. 10, whenever the upper end of latch lever 162 permits such movement. The slightest movement of latch lever 162 out of its normal position, as shown in Fig. 7, in which the parts of the machine are in proper position to deliver a printed ticket as soon as a person steps upon the scale platform, causes the locking edge 226 to move to a position over the edge of weight 212 and thus prevent the raising of this weight and the opening of the coin gate.

Figure 15:
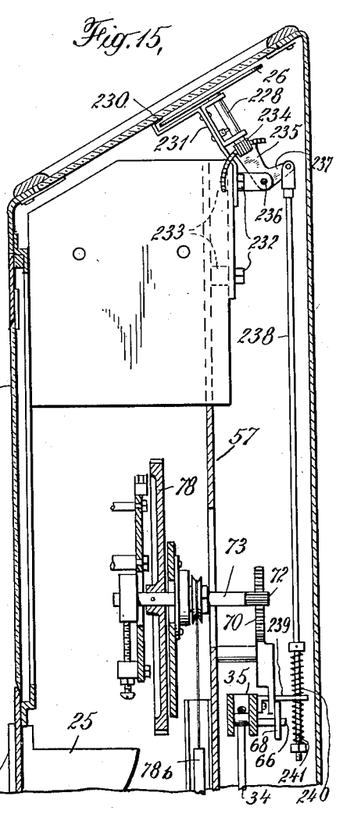
Fig. 15 is a vertical section taken on the same plane as Fig. 9, showing the upper part of the casing with the ribbon feeding mechanism and certain parts of the other mechanism removed and illustrating particularly the indicator in the sloping upper face of the casing, and the mechanism for actuating the same.

There remains to be described the mechanism for operating indicator 26 which is illustrated in Figs. 15, 9 and 7, and the particular construction of the coin receptacle.

Figure 1:
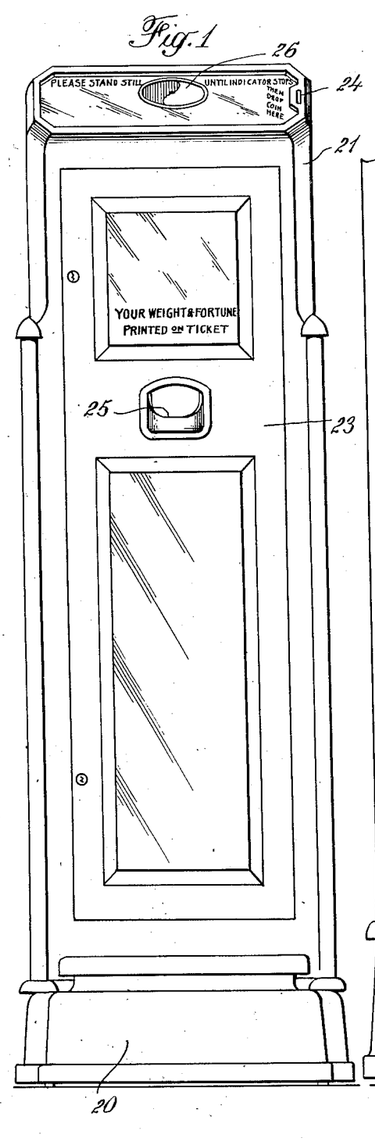
Figure 1 is a front elevation of the machine.
Figure 16:
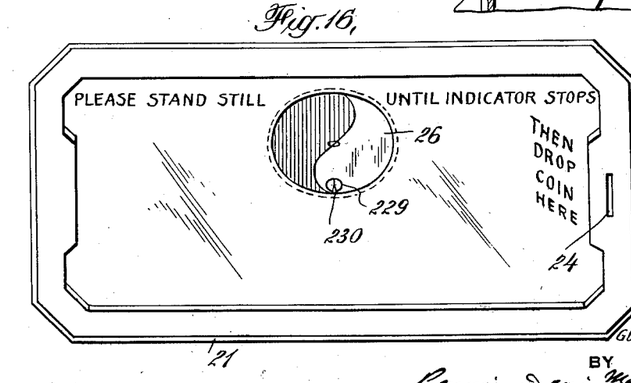
Fig. 16 is a plan view looking down on the top of the scale casing.

Indicator 26 consists of a disc having a conspicuous marking on its outer surface as shown in Figs. 1 and 16, so as to make the movement of the disc noticeable to the person on the scale platform. The disc is mounted upon the outer end of a shaft 228 close to a circular window in the sloping top of casing 21. The zero point of the scale is shown by the indicator by means of a small circle 229 which is opposite a pointer 230 when there is no weight upon the scale platform.

The indicator shaft 228 is mounted for rotation in a bracket 231 which is attached to plate 57 by means of screws 232 and spacers 233. On the lower end of shaft 228 is a pinion 234. A gear segment 235 having crowned teeth meshing with pinion 234 is pivoted at 236 to an extension of bracket 231. The gear segment 235 has a bell crank lever 237 to the outer end of which is pivoted a rod or link 238 which drops down and is connected to a small bracket 239 which is fastened to scale beam 35 and the weighing mechanism. In order to provide a flexible connection between the indicator and the weighing mechanism, rod 238 passes loosely through an aperture in bracket 239 and the motion of the bracket is transmitted to the rod by means of two helical springs 240 and 241, the upper end of spring 240 bearing against a small collar fixed to rod 238 and the lower end of spring 241 against a nut threaded upon the rod.

When a person steps upon the scale platform, the scale beam 35 descends carrying with it pin 66 of the sealing mechanism. Printing disc 78 is rotated and gear member 70 descends in accordance with the movement of pin 66 and weight 78b causes the lost motion between pinion 72 and the teeth of gear member 70 to be taken up, and the upper surface of sealing slot 67 to rest upon pin 66. The motion of scale beam 35 is transmitted to the indicator 26 by means of the mechanism just described, so that the person upon the scale platform may know that the weighing mechanism is in a condition of equilibrium before dropping the coin in the coin chute. By operatively connecting the indicator 26 with the scale beam 35, interference with the operation of the sealing mechanism which might be caused by the friction of the indicator actuating mechanism is avoided.

Figure 17:
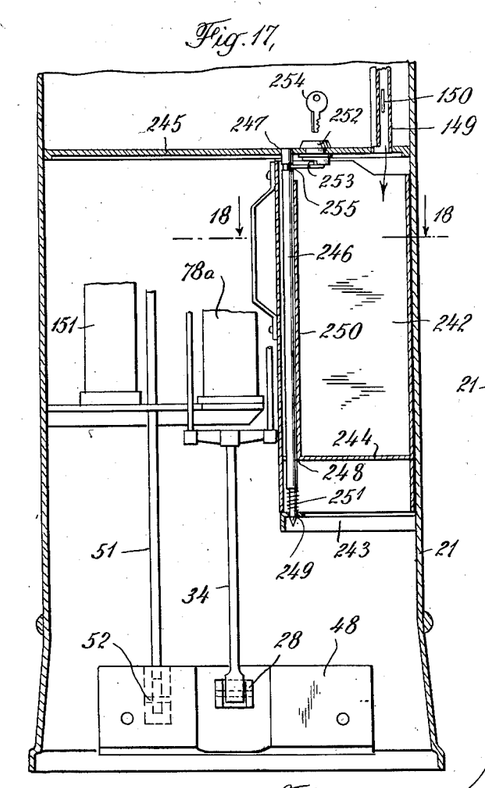
Fig. 17 is a vertical transverse section taken through the lower part of the scale casing for the purpose of showing the construction of the coin receptacle.
Figure 18:
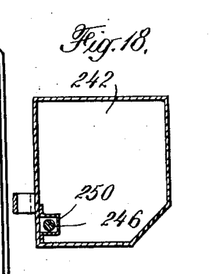
Fig. 18 is a horizontal section taken on line 18—18 of Fig. 17 to illustrate a detail of the coin receptacle.

Referring now to Figs. 17 and 18 of the drawings, the coin receptacle 242 consists of an elongated metal box which rests upon a transverse support 243 with one wall preferably close to an outside wall of casing 21. Support 243 is preferably located just below the bottom of door 23 which is hinged to the front of the casing. The hinges (not shown) of this door are internally mounted for the purpose of concealment, and in order to allow the lower hinge bracket space for movement, the bottom 244 of the coin receptacle is located somewhat above the bottom of the outside walls of the receptacle which rest upon support 243. A shelf 245 of substantial construction extends transversely across the casing 21 above the open top of coin receptacle 242, and forms a closure for the receptacle. The coin chute 149 passes through shelf 245 and delivers the coin 150 from the weighing and ticket printing mechanism above to the coin receptacle.

It is important that the coin receptacle be locked securely in place so that it cannot be readily removed by unauthorized persons, and in order to accomplish this a locking rod 246 passes through an aperture 247 in shelf 245, thence through an aperture 248 in the bottom 244 and then into or through an aperture 249 in support 243. Preferably a guard 250 surrounds the locking rod within the coin receptacle so as to keep the coins away from the rod and provide an unobstructed channel extending vertically of the receptacle for the passage of the locking rod.

When the locking rod is in position, as shown by the full lines in Fig. 17, the top end of it is flush with the upper surface of shelf 245 so that it is impossible to get at the locking rod to remove it. A spring 251 at the lower end of the rod, however, urges the rod upwardly so that it may be grasped with the fingers at its upper end and readily removed. The locking rod is held down against the force of spring 251 and with its head flush with the top of shelf 245 by means of a lock mechanism 252, the bolt of which 253 can be thrown (by turning key 254) into and out of engagement with a recess 255 slightly below the upper end of the rod.

The characteristic advantages of the improved machine of the invention are its simplicity of construction, its positive operation, quietness, durable wearing qualities, and the assemblage of the various parts of the mechanism in a small compass with the use of few heavy parts so that a relatively small machine of comparatively light weight is produced.

I have herein described and illustrated what I now consider the preferred construction of the machine. It will be understood that changes may be made without departing from the spirit of the invention.

I claim:

1. In a weighing and ticket printing machine the combination of weighing mechanism including a platform adapted to move up and down, ticket printing mechanism associated therewith including a printing hammer, and means for moving it against a ticket to print the same, ticket feeding mechanism for feeding tickets successively to printing position and ejecting them therefrom, coin-released mechanism for releasing the printing hammer to cause the printing of a ticket, an actuator comprising a main actuating lever pivoted between its ends, connections between one end of said lever and the ticket-feeding mechanism to actuate the same, and connections between the opposite end of said lever and the printing hammer to reset the hammer after a printing operation, energy-storing means for operating said actuator, a latch for holding said actuator in a position in which energy is stored in said energy-storing means, a weight operatively connected with the platform to move up when the platform is moved down, a latch for holding said weight in the upward position, said actuator latch being disposed adjacent said printing hammer and engaged thereby to trip the latch for the actuator near the end of the printing movement of the hammer thereby causing said actuator to be actuated by said energy-storing means to cause the resetting of said hammer and the delivery of the printed ticket, and means actuated by the said movement of the actuator to release said weight latch and allow the weight to move the actuator to its original position.

2. In a weighing and ticket printing machine the combination of weighing mechanism, ticket printing mechanism associated therewith including a printing hammer and means for moving it against a ticket to print the same, ticket feeding mechanism, a main actuating lever, connections between said main actuating lever and the ticket feeding mechanism to actuate the same, connections between said main actuating lever and the printing hammer to reset the hammer after a printing operation, means for operating the main actuating lever, and a latch for holding said lever against the force exerted by said operating means, said latch having one end adjacent said printing hammer, and said hammer having a member thereon adapted to strike said latch when the printing hammer falls and release said main actuating lever so as to cause the resetting of said hammer and the feeding of the printed ticket.

3. In a weighing and ticket printing machine the combination of weighing mechanism, ticket printing mechanism and ticket feeding mechanism associated therewith, said ticket feeding mechanism comprising a ticket feeder slidable in a pair of guides, and means for actuating said ticket printing and feeding mechanism comprising a main actuating lever mounted in substantially parallel relation to the ticket feeder guides and pivoted for limited oscillation, a pivoted lever mounted substantially at right angles to said main actuating lever and connected at one end to said ticket feeder and at the opposite end operatively connected to the main actuating lever, said main actuating lever being connected at its opposite end with said printing hammer to cause the resetting of the same when the main actuating lever moves to effect the feeding of a ticket, means for operating said main actuating lever and a latch operated by the movement of the printing hammer to printing position to release said main actuating lever from the pull of its operating means and cause the resetting of the printing hammer and the feeding of a ticket.

4. In a weighing and ticket printing machine having ticket printing mechanism including a printing hammer and means for moving it against a ticket to print the same, ticket feeding mechanism, and an actuator adapted to actuate the ticket feeding mechanism and reset the printing hammer, the combination of a platform adapted to move up and down, a weight operatively connected to said platform and elevated thereby when the platform is moved down, a rod operatively connected with said weight to move therewith having one end extending into close proximity with said actuator, a slotted lever pivoted on said rod and having a latching notch, a support engaged by said notch when said rod rises to hold said weight in its upward position, a projection on said actuator cooperating with the slot in said slotted lever, one wall of said slot being adapted to serve as a cam coacting with said projection for moving said lever about its pivot to carry said latching notch away from said support and cause the actuator to be reset by the descent of said weight the motion thereof being transmitted to the actuator by the upper end of said slot.

5. In a weighing and ticket printing machine the combination of a ticket printing mechanism including a printing hammer and means for moving it against a ticket to print the same, a latch for holding said hammer in position to be released for effecting a printing action, and an inertia mechanism for disengaging said hammer latch comprising a weight, coin released mechanism for holding said weight in elevated position, and means for operatively connecting said weight with said hammer latch including a lost motion connection whereby the weight is allowed to fall a predetermined distance before the force of the falling weight is applied to the latch to disengage the same.

6. In a weighing and ticket printing machine the combination of ticket printing mechanism, ticket feeding mechanism including a reciprocating member, a signal device including a pivoted striker supporting member normally biased against a stop, a trigger pivoted to said striker supporting member and having one end projecting into the path of said reciprocating member, and a lug on said striker supporting member for coacting with said trigger to cause the striker supporting member to be moved away from said stop by said reciprocating member, the continued movement of said reciprocating member effecting the release of said trigger and the sounding of said signal device and the return movement of said reciprocating member causing said trigger to move away from said lug without moving said striker supporting member.

7. In a weighing and ticket-printing machine, the combination of a weighing mechanism including a platform adapted to move up and down, ticket-printing mechanism associated therewith, means for operating said printing mechanism, means including an actuating spring for substantially instantly after a printing operation resetting said printing mechanism to a position for another printing operation, a weight operatively connected to said platform and elevated thereby when the platform is moved downwardly, connections between said weight and spring for causing energy to be stored in said spring when the weight moves downwardly and thereby place the resetting means in an energized condition, means for retaining said resetting means in energized condition, and means for releasing said resetting means to permit a resetting of said printing mechanism.

8. In a weighing and ticket-printing machine, the combination of a weighing mechanism including a platform adapted to move up and down, ticket-printing mechanism and ticket-feeding mechanism associated therewith, means for operating said printing mechanism, means including an actuating spring for substantially instantly after a printing operation resetting said printing mechanism to a position for another printing operation, and operating said ticket-feeding mechanism to feed another ticket to printing position and to cause the printed ticket to be ejected, a weight operatively connected to said platform and elevated thereby when the platform is moved downwardly, connections between said weight and spring for causing energy to be stored in said spring when the weight moves downwardly and thereby place the resetting means and the ticket-feeding means in an energized condition, means for retaining said spring in energized condition, and means for releasing said retaining means to permit a resetting of said printing mechanism and said ticket-feeding means.

9. In a weighing and ticket-printing machine, the combination of a weighing mechanism including a platform adapted to move up and down, ticket-printing mechanism and ticket-feeding mechanism associated therewith, an actuator operatively connected with said ticket-printing mechanism and said ticket-feeding mechanism, a spring operatively associated with said actuator to cause a resetting of the ticket-printing mechanism and the actuation of the ticket-feeding mechanism, a weight operatively connected to said platform and elevated thereby when the platform is moved downwardly, connections between said weight and said actuator to cause said actuator normally to be maintained in a position to maintain energy stored in said spring by a downward movement of said weight, and means for releasing said actuator to permit said spring, substantially instantaneously after a printing operation, to reset the printing-mechanism to printing position and to actuate the ticket-feeding mechanism to feed a ticket to printing position and to eject the printed ticket.

10. In a weighing and ticket-printing mechanism, the combination of a weighing mechanism including a platform adapted to move up and down, ticket-printing mechanism associated therewith and including a printing hammer and means for moving it against a ticket to print the same, ticket-feeding mechanism for feeding tickets successively to printing position and ejecting them therefrom, coin-released mechanism for releasing the printing hammer to cause the printing of a ticket, a main actuating lever operatively connected with said ticket-printing mechanism and said ticket-feeding mechanism, a spring operatively connected to said main actuating lever to operate said lever to cause a resetting of the ticket-printing mechanism and the actuation of the ticket-feeding mechanism, a latch for holding said lever against movement under the influence of said spring, a weight operatively connected to said platform and elevated thereby when the platform is moved downwardly, a latch for holding said weight in the upward position, connections between said weight and said main actuating lever to cause said lever normally to be maintained in a position to maintain energy stored in said spring by the downward movement of said weight, means operated by the printing hammer near the end of its printing movement to trip the latch for the main actuating lever and thereby permit said main actuating lever to be actuated by said spring, substantially instantaneously after a printing operation, to reset said hammer and deliver the printed ticket, and means actuated by the movement of the main actuating lever to release said weight latch and permit the weight to move the main actuating lever to its normal position in which it stores energy in said spring.

11. In a weighing and ticket-printing mechanism, the combination of a weighing mechanism, ticket-printing mechanism associated therewith and including a printing hammer and means for moving it against a ticket to print the same, ticket-feeding mechanism for feeding tickets successively to printing position and ejecting them therefrom, an actuator operatively connected with said ticket-printing mechanism and said ticket-feeding mechanism, a spring operatively connected to said actuator to actuate the same to cause a resetting of the ticket-printing mechanism and the actuation of the ticket-feeding mechanism, a latch for holding said actuator against movement under the influence of said spring, means operated by the printing hammer near the end of its printing movement to trip said latch and thereby permit said actuator to be actuated by said spring, substantially instantaneously after a printing operation, to reset said hammer and deliver the printed ticket.

GUSTAV F. HOCHRIEM.